United States Patent [19]

Marrero

[11] 4,023,697
[45] May 17, 1977

[54] WALL SWITCH AND OUTLET FRAME

[76] Inventor: Louis Marrero, 1209 Via Ramon, Escondido, Calif. 92025

[22] Filed: July 29, 1976

[21] Appl. No.: 709,629

[52] U.S. Cl. .............................. 220/3.4; 220/3.3; 220/3.7; 220/3.92
[51] Int. Cl.$^2$ ........................................ H02G 3/08
[58] Field of Search ............. 220/3.4, 3.2, 3.3, 3.5, 220/3.6, 3.7, 3.8, 3.9, 3.94, 326, 3.92; 52/221

[56] References Cited

UNITED STATES PATENTS

| | | | |
|---|---|---|---|
| 1,888,853 | 11/1932 | France et al. | 220/3.4 X |
| 2,155,627 | 4/1939 | Welch | 220/3.6 |
| 2,793,782 | 5/1957 | Austin | 220/3.6 X |
| 3,127,047 | 3/1964 | Bolchalk | 220/3.7 X |

*Primary Examiner*—William Price
*Assistant Examiner*—Steven M. Pollard
*Attorney, Agent, or Firm*—Ralph S. Branscomb

[57] ABSTRACT

The invention comprises an electrical fixture which may be a light switch, outlet receptacle or the like and includes a stud-mounted bracket which receives in sliding relation a wiring box which is spring loaded to project forwardly against wallboard, there being a pair of spikes connected to the assembly which penetrate through wall board pressed against the forward surface of the assembly so that the location of the apparatus is apparent from the other side of the wallboard, these spikes being removably connected to detents which prevent locking of the wiring box into the bracket until the spikes are removed, so that upon removal of the portion of wallboard located by the penetrating tips of the spikes, the spikes themselves remain embedded in the wallboard thus removing the detents from a locking element which snaps into place after the wiring box has thrust forward to a position flush with the forward surface of the wall to lock the wiring box in this position.

5 Claims, 8 Drawing Figures

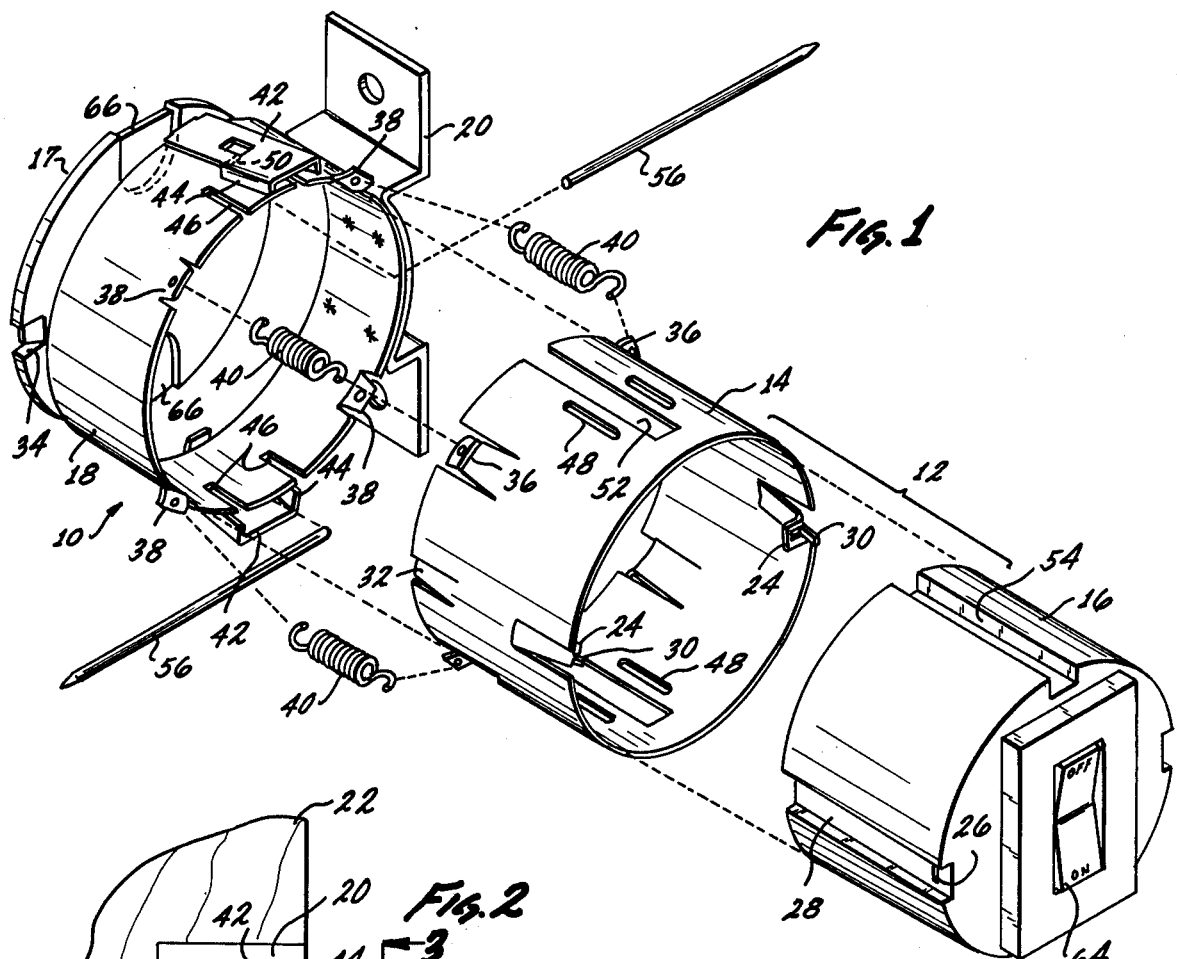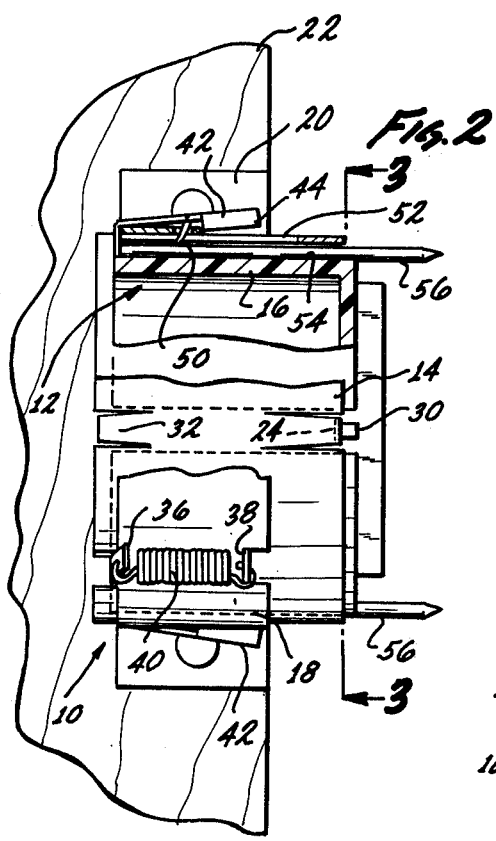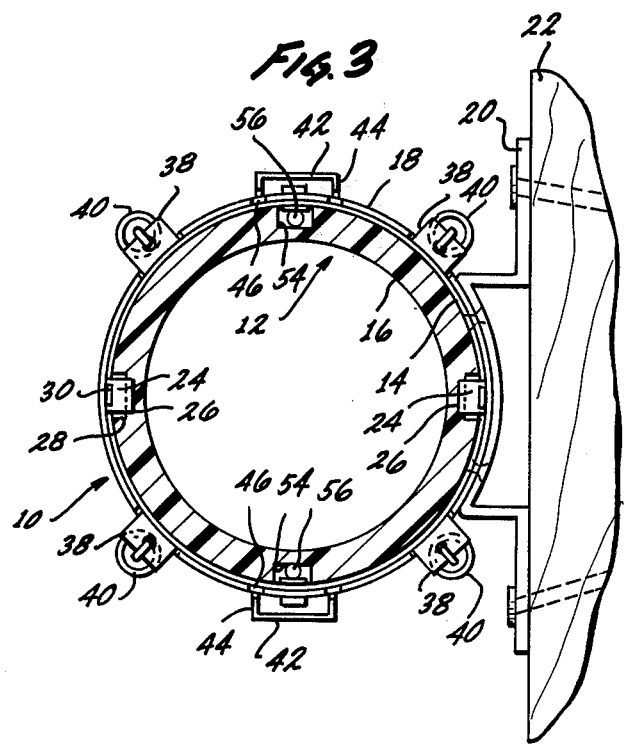

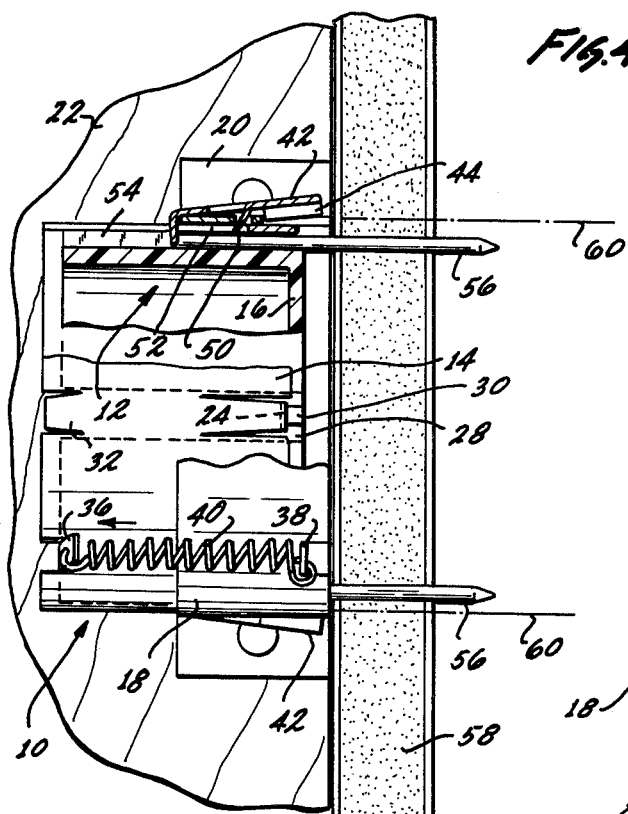
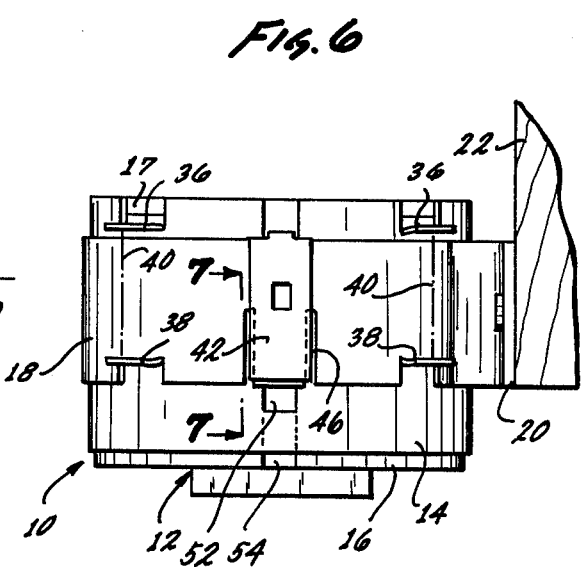
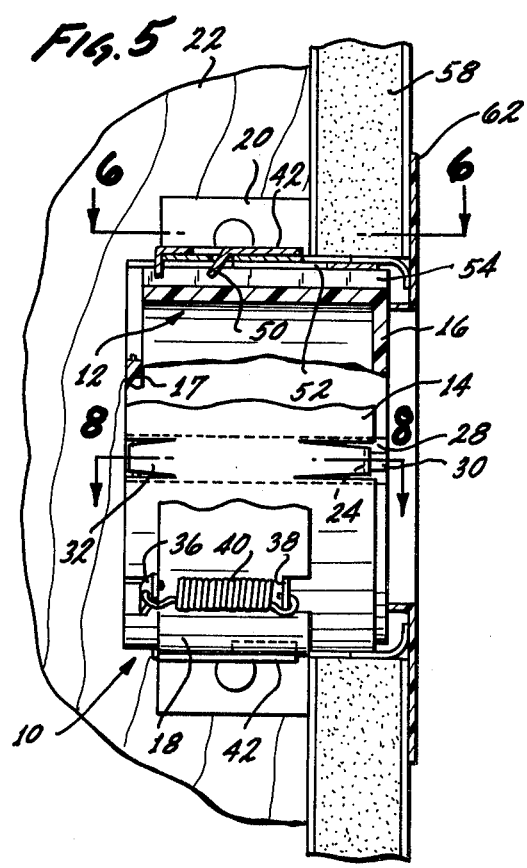
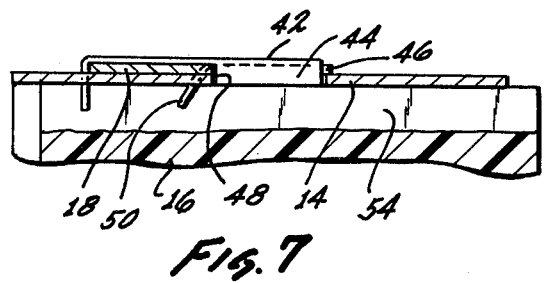
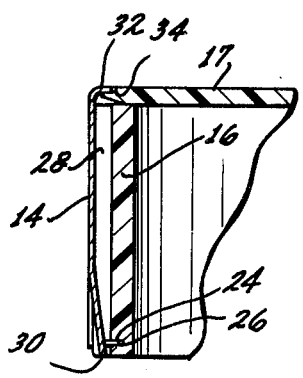

WALL SWITCH AND OUTLET FRAME

BACKGROUND OF THE INVENTION

Electrical assemblies comprising switch outlets and plug receptacles installed in houses which are being built are subject to the difficulty of aligning the forward face of the assembly with the surface of the yet to be mounted wallboard so that the facia plate will fit snuggly when the wall is finished and the assembly will be readily accessible. Currently this is accomplished in a rather crude fashion by simply mounting a wiring box on a stud, judging how far forward of the stud it should project to mate flushly with the interior surface of the wallboard, and the wallboard is then cut roughly by hand so that a hole approximately the size and position of the wiring box is produced and the wall board is subsequently mounted thereover. This entire procedure is somewhat crude, and there is a need for an electrical assembly, be it a wall switch, plug receptacle or the like, which can be mounted on a stud and both mark the portion of the wallboard which should be cut subsequent to wallboard installation, and automatically adjust to the proper position flush with the wallboard when the wallboard hole has been cut.

SUMMARY OF THE INVENTION

The present invention fulfills the abovementioned need and includes a preferably cylindrical wiring box which fits within a cylindrical mounting bracket which would ordinarily be mounted on a stud, there being coil springs or the equivalent biasing the wiring box forward into the room from which the assembly is to be accessible. A pair of springloaded locking tabs snap into place to lock the wiring box into its final position and these locking elements are prevented from engaging by spacer sleeves having spiked forwardly extended projections designed to penetrate a sheet of wallboard pressed over the assembly such that the tips of the spiked projections indicate on the exposed surface of the wallboard the exact position of the electrical assembly such that the appropriate hole may be cut with a circular hole cutter, the circle removed from the wallboard having the spiked projections in it so that removal of the circle also removes the detents which permit the locking tabs to snap into place to lock the wiring box into its final position.

BRIEF DESCRIPTION OF THE DRAWINGS

FIG. 1 is an explosed view of the assembly;

FIG. 2 is a side elevation view of the assembly showing the upper portion thereof cut away;

FIG. 3 is a section view taken along line 3—3 of FIG. 2;

FIG. 4 is a side elevational view of the lower portion of this assembly showing the upper portion cut away and the wall board in section illustrating the effect of initial placement of the wall board against the assembly;

FIG. 5 is a view similar to FIG. 4 but after an opening has been cut in the wall board, and the spikes have been removed from the assembly;

FIG. 6 is a section taken along line 6—6 of FIG. 5;

FIG. 7 is a sectional view taken along line 7—7 of FIG. 6; and

FIG. 8 is a section taken along line 8—8 of FIG. 5.

DETAILED DESCRIPTION OF THE PREFERRED EMBODIMENT

Generally speaking the electrical fixture of the present invention comprises two basic parts, a mounting bracket 10 which is fastened to a wall stud and a wiring box 12 which is received in the bracket in sliding relation at least during installation, the wiring box acting as a unit but being manufactured in two parts, a metal collar 14 and a plastic body portion 16, the assembly of which will be described hereinafter.

The bracket 10 includes a cylinder 18 preferably of stamped metal construction, there being a pair of mounting flanges 20 having nail holes therein so that the bracket can be conveniently nailed to the vertical stud 20 of a building which would normally be under construction. Both the collaar 14 and the body 16 of the wiring box are cylindrical and the latter fits within the former and is locked in place by spring biased detents 24 which snap into slots 26 disposed in channels 28 as these two pieces are mated. The detents are formed in such a fashion that tabs 30 extend forwardly therefrom so that if subsequent to the assembly of these components their dismantling is required it can be accomplished by disengaging their detents with a screwdriver on the tabs. The back plate 17 of the wiring box is engaged by the spring loaded fingers 32 which pass through the cut away portion 34 of the back plate so that the wiring box can simply be assembled by press setting the body portion into the collar and then the back portion into the rear of the collar.

Once the mounting bracket 10 has been fastened to a stud adjacent the wall through which access to the electrical fixture is desired, first the collar and then the body of the wiring box are inserted into the cylindrical portion of the mounting bracket as can be easily visualized from FIG. 1 and such that the configuration illustrated in FIG. 2 is achieved. When this is done, there are four apertured tabs 36 which are spring loaded by virtue of the manner in which they have been cut from the collar, these tabs being compressed inwardly by the wall of the mounting bracket until the rear edge of the collar has cleared the rear edge of the cylinder 18 at which point these tabs spring outwardly to their original position. Each of these tabs is aligned with a similar tab 38 projecting outwardly from the front edge of the cylinder 18, and four coil springs 40 are connected between each pair of tabs so that the wiring box is spring loaded into a forwardly projecting position in the mounting bracket as illustrated in FIG. 2. It will be noted that because of the tabs 36, which encounter the rear edge of the mounting bracket, the wiring box cannot move forwardly beyond the position illustrated in FIG. 2, although it may be pressed rearwardly against the spring tension as far as the springs will permit.

A pair of leaf-type springs 42 are tacked or otherwise securely attached to the rear surface of the mounting bracket and the forward side edges of these spring members are flanged to define keys 44 which are biased by the springs into engagement with the slots 46 in the mounting bracket and the slots 48 in the collar of the wiring box. Were these leaf-springs not restrained, upon sliding the wiring box until the slots 48 align with the slots 46 the keys would snap into place and securely lock the wiring box against sliding in the mounting bracket. However, each of these leaf springs is provided with an inwardly struck tongue 50 which passes through deep slots 52 in the wiring box collar and extend into channels 54 of the body 16, and there is a spike 56 inserted into each one of these channels such that the tongue is depressed outwardly as can be seen in FIG. 2 so that the spikes act as detents to prevent engagement of the keys with the pairs of slots. By the same token when the spikes are removed from their channels the keys will snap through the first pair of slots and upon proper alignment of the wiring box the slots 48 will be engaged thus locking the wiring box in position.

During the installation of the electrical fixture, the mounting bracket is attached to the stud as already mentioned and results in a configuration such as that in FIG. 2 with the wiring box projecting forwardly of the stud and the coil springs 40 in a retracted position. A sheet of wall board 58 may now be permanently installed on the stud and across the face of the electrical fixture as illustrated in FIG. 4, and as the wall board is pressed against the fixture the spikes project through the wall board as shown, resulting in the concomitant rearward displacement of the wiring box.

Because the pointed tips of the spikes 56 project through the wall board, it can be determined exactly where the circular hole cutter may be employed to this end to make a hole at the position indicated at 60. The resulting circular disc which is cut away will have the spiked embedded in it and as it is removed, so will the spikes be removed, and their function as detents eliminated permitting the keys 44 to snap into their lock-ready position, and at the same time the wiring box springs forward under the action of the coil springs 40 until the slots 46 and 48 align, at which point the keys securely lock the wiring box in its final resting place as shown in FIG. 5.

The location of the slots is such that the wiring box will be positioned slightly inside the exposed surface of the wall board, and a facia plate 62 can be installed directly to the wall board without having any connection to the electrical apparatus, this arrangement having the practical advantage that once the amounting bracket has been initially attached to the stud, the installing electrician will not be required by Union rules to attach the facia plate, but the carpenter who installs the wall board can do it, thus saving additional labor time.

It has been mentioned that the wiring box may be either for an outlet receptional, or for a light switch as represented by the toggle switch element 64, the connecting wires being threaded through knock-outs 66 in the back plate 17. The wiring connections and contacts within the wiring box may be of any kind desired, and including the easily connected press-in type connectors, and an electrical outlet receptacle for one or more plugs may be utilized in the wiring box rather than the light switch which is shown.

After the fixture has been completely installed, it may be removed for repair or to alter the electrical function, for example by replacing a switch with an outlet, by removing the facia plate, and then with a screwdriver or the like displacing the tabs 30 outwardly to release the plastic body portion 16 of the wiring box which may then be pulled out forwardly exposing the wiring structure inside.

Although the entire assembly and operation of the electrical fixture has been described, ordinarily all assembly work short of wiring the box would be done at the site of manufacture so that all that need by done at the construction site would be fastening the mounting bracket to a stud and making the wire connections to the wiring box. Alignment with the wiring box with the front of the wall board is accomplished automatically upon making the hole in the wall board as described above, so that the only additional step that need be taken to finish the procedure is the installation of the facia plate.

I claim:

1. An electrical fixture for mounting in the wall of a building and to be accessible through a wall thereof, said fixture comprising:
   a. a mounting bracket;
   b. a wiring box receivable in said mounting bracket and when received therein having at least limited freedom of movement in the direction perpendicular to a wall through which said fixture is to be accessible;
   c. means biasing said wiring box forward on said mounting bracket toward said wall; and
   d. means to lock said wiring box in said bracket against movement upon installation of said wall and subsequent to properly aligning said wiring box relative to said wall.

2. Structure according to claim 1 wherein said wiring box includes an enclosing collar, said collar being telescopically received in said bracket and having at least one aperture therein, said bracket also having an aperture and said apertures being aligned when said collar and bracket are in a certain relative position, and said means to lock comprises a key mounted on said fixture and biased to penetrate said apertures to lock said collar and said brackett against relative movement when said apertures are aligned, and further including a releasable detent preventing entry of said key into said apertures and thus preventing the locking of said wiring box in said mounting bracket until said detent is released.

3. Structure according to claim 2 wherein said key is biased into said aperture on a spring arm and said detent comprises a spike disposed adjacent to said spring arm and spacing said key from said aperture.

4. Structure according to claim 3 wherein said spike is dimensioned to penetrate a section of wall board pressed against said fixture such that said spike indicates the segment of wall board to be cut away and said spike will remain in said wall board segment when same is removed.

5. Structure according to claim 1 wherein said wiring box is generally cylindrical and includes a plurality of spaced tabs on the rear edge thereof, and said mounting bracket is generally cylindrical and receives said wiring box in sliding relation and has a plurality of tabs spaced on the forward edge thereof, and said bias means comprises a plurality of coil sprngs connecting the tabs on said wiring box to the tabs on said mounting bracket.

* * * * *